United States Patent [19]

O'Connor et al.

[11] Patent Number: 5,684,298

[45] Date of Patent: Nov. 4, 1997

[54] PHOTONIC-BASED SENSING APPARATUS USING DISPLACEMENT TRACKING OF AN OPTICAL BEAM IN A SEMICONDUCTOR

[75] Inventors: Stephen D. O'Connor, Pasadena; Schubert Soares, Canyon Country, both of Calif.

[73] Assignee: California Institute of Technology, Pasadena, Calif.

[21] Appl. No.: 547,957

[22] Filed: Oct. 25, 1995

Related U.S. Application Data

[63] Continuation-in-part of Ser. No. 271,113, Jul. 6, 1994, abandoned.

[51] Int. Cl.⁶ .................................................. G01D 5/34
[52] U.S. Cl. ........................... 250/231.1; 250/227.21; 73/517 R
[58] Field of Search .................. 250/231.1, 214 PR, 250/227.21, 561, 559.4; 73/800, 655, 517 R

[56] References Cited

U.S. PATENT DOCUMENTS

| | | | |
|---|---|---|---|
| 3,121,795 | 2/1964 | Marvin | 250/212 |
| 3,423,597 | 1/1969 | Delp | 250/231 |
| 3,789,674 | 2/1974 | Anderson et al. | 73/517 R |
| 4,239,963 | 12/1980 | August et al. | 250/231.1 |
| 4,403,144 | 9/1983 | Strahan et al. | 250/231.1 |
| 4,432,599 | 2/1984 | McMahon | 350/96.15 |
| 4,592,235 | 6/1986 | Fink | 73/517 R |
| 4,703,174 | 10/1987 | Anderson et al. | 250/227.21 |
| 5,087,810 | 2/1992 | Carome | 250/227.21 |
| 5,298,964 | 3/1994 | Nelson et al. | 356/33 |
| 5,365,059 | 11/1994 | Savage | 250/231.1 |

*Primary Examiner*—Stephone Allen
*Attorney, Agent, or Firm*—Michaelson & Wallace

[57] ABSTRACT

The invention employs a high-resolution semiconductor optical beam position sensor mechanically coupled to an optical beam source by a mechanical linkage which is either elastically deformable (in the case of a vibration sensor or accelerometer) or thermally expandable (in the case of a temperature sensor). The semiconductor optical beam position sensor is a planar semiconductor with a pair of electrodes thereon defining a gap therebetween. The optical beam has a uniform optical density or beam intensity which traverses within the inter-electrode gap. The two electrodes are two rectifying contacts on the surface of the semiconductor irradiated by the laser beam. The short circuit photocurrent across the gap will vary in a well-defined manner as the laser spot is scanned to either side of the symmetric position, thus allowing a readout indicative of acceleration or vibration (in the case of an elastically deformable linkage between beam source and sensor) or indicative of temperature (in the case of a thermally expandable linkage between beam source and sensor).

22 Claims, 4 Drawing Sheets

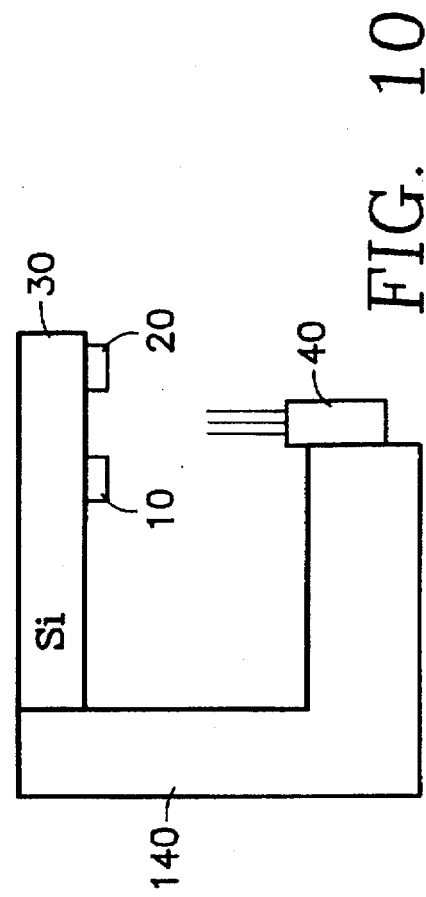
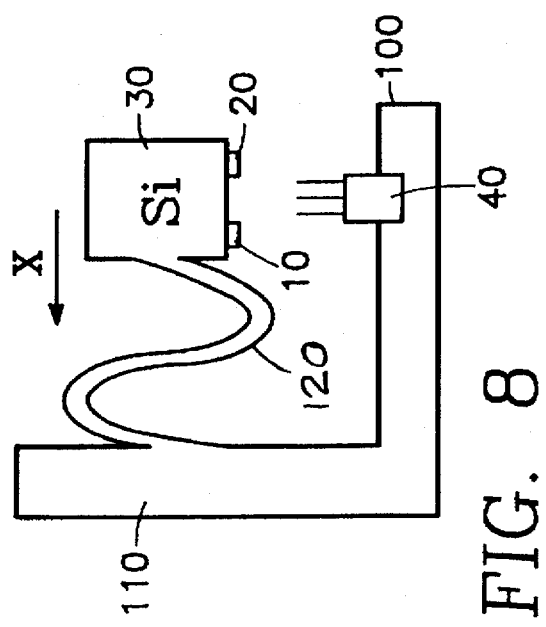
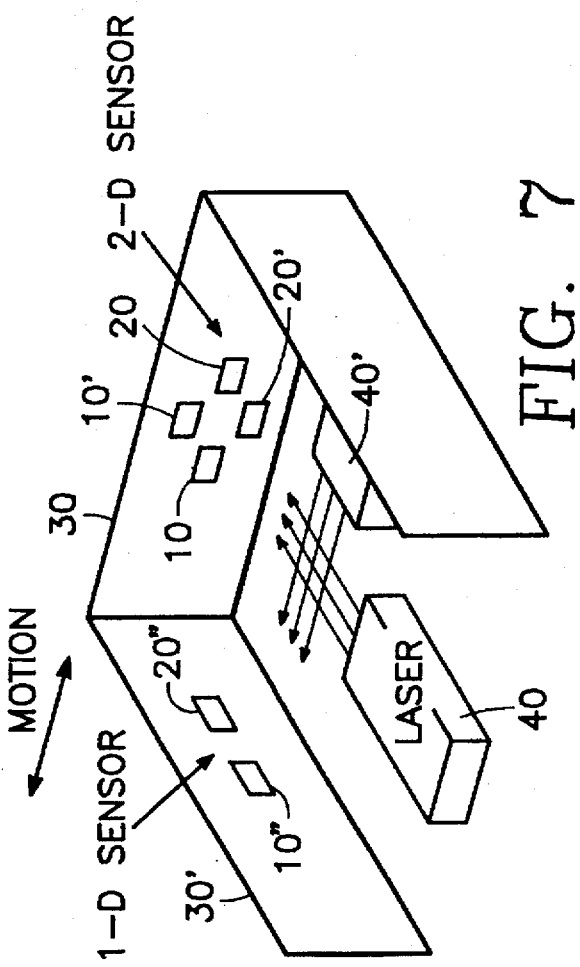

1

PHOTONIC-BASED SENSING APPARATUS USING DISPLACEMENT TRACKING OF AN OPTICAL BEAM IN A SEMICONDUCTOR

This is a Continuation-In-Part of application Ser. No. 08/271,113, filed Jul. 6, 1994, abandoned.

BACKGROUND OF THE INVENTION

1. Technical Field

The invention is related to vibration, acceleration and temperature sensors employing optical beam displacement sensing at a junction of a semiconductor.

2. Background Art

1. Position Sensors

With the increasing emphasis on and importance of micro fabrication in modern manufacturing, there are a number of emerging areas where such high resolution position sensors are needed. Modern semiconductor manufacturing is a clear example. Future generations of very large scale integrated circuits (VLSIC) are projected to have critical dimensions in the range of 350 nm by the early 1990's. Circuit lines and via holes, etc., will have to be accurate to a small fraction of this dimension to insure manufacturability. An important related problem is that of aligning the multiple levels of lithography used in VLSI manufacture with an accuracy that is a small fraction of the critical dimension. Ideally, this should be done in the exposure tool before exposure rather than checked and corrected after development of a photoresist level.

A related problem is that of an optical disk memory in which individual pixels of information, with dimensions on the order of an optical wavelength, are read and/or written with a laser beam, often from a semiconductor diode laser.

Similar alignment tasks arise in a number of architectures that have been proposed for optical computing, particularly those that envision a parallel processing configuration in which optical signals generated in one plane of the processor are modified, e.g. by a spatial light modulator, in a second plane and/or subsequent planes and finally detected in some way at a final plane of the processor. A similar, but simpler, problem is aligning chip-to-chip and board-to-board signals which are optically transmitted, especially in a free-space mode, in a more conventional electronic computer architecture. Such optical interconnects are being actively investigated to eliminate signal traffic limitations in conventional electronic interconnects. Undoubtedly, there are many additional uses which are either already apparent or will become important as technology advances.

U.S. Pat. No. 4,987,461 to Brueck et al. discloses a position sensor employing a planar semiconductor with a pair of electrodes thereon defining a gap therebetween and a focused laser beam of focal spot size smaller than the inter-electrode gap. Such a position sensor has a resolution below 100 nm. The two electrodes are two rectifying contacts on the surface of the semiconductor irradiated by the laser beam. For a symmetric electrode configuration, the short circuit photo-current arising from the laser illumination will exhibit a null when the laser spot is symmetrically located relative to the electrodes, and will vary in a well-defined manner as the laser spot is scanned to either side of the symmetric position, thereby providing a position measurement.

2. Other Types of Sensors

A variety of sensing devices, including vibration sensors, accelerometers and temperature sensors have limited resolution or accuracy. It is an object of the present invention to overcome such limitations.

Current Vibration Sensors

Vibration sensors are used to measure local stress and as accelerometers. Current techniques to measure vibrations are based on the strain gauge, piezoelectric effect, or acousto-optic effect. Each method is described below.

Strain Gauges

The strain gauge is by far the most common instrument used in experimental stress analysis. It consists of a resistive element in the form of a long metal ribbon. The gauge is part of a balanced Wheatstone bridge network. The strain produced by the vibration changes the resistivity of the metal; this change is measured and compared to a calibrated resistor in the network. The vibration measurement is relatively slow with a limited bandpass. Also, the sensitivity of the strain gauge is very limited. For many applications, it is often essential to measure relative displacements on a much smaller scale and with a higher bandwidth than is currently available.

Piezoelectric Sensors

An alternative means for detecting vibrations is to use a piezoelectric crystal that undergoes polarization when stressed. The fluctuating voltages produced are then amplified. Piezoelectric crystals are expensive to fabricate and package. Each crystal requires its own calibration; the crystals can also be re-poled requiring an additional calibration. Piezoelectric vibration measurements have bandwidth limitations and poor sensitivity analogous to the strain gauge.

Acousto-Optic Sensors

The refraction of a laser beam through an acousto-optic crystal is yet another alternative. Vibrations change the crystal's index of refraction. The laser beam is deflected by an angle proportional to the vibrational displacement; the deflection is measured on a position sensitive detector array. This is very sensitive means of detecting vibrational displacements but requires expensive and complicated experimental apparatus.

Current Temperature Sensors

Modern temperature sensing techniques are based on the measurement of a temperature dependent resistance through a metal or a semiconductor; the resistance decreases as the temperature is lowered. A current is passed through the sensor and the voltage across it is monitored.

Resistive thermometers are calibrated by fitting the resistance/temperature dependence to an analytical curve. This curve fitting procedure is often tedious and unreliable. Typically, a resistive carbon/glass thermometer capable of 0.05 degrees K accuracy over the entire cryogenic range (4 degrees K to room temperature) costs thousands of dollars.

SUMMARY OF THE INVENTION

The invention employs a high-resolution semiconductor optical beam position sensor mechanically coupled to an optical beam source by a mechanical linkage which is either elastically deformable (in the case of a vibration sensor or accelerometer) or thermally expandable (in the case of a temperature sensor). The semiconductor optical beam position sensor is a planar semiconductor with a pair of electrodes thereon defining a gap therebetween. The optical beam source has a uniform optical density or beam intensity which traverses within the inter-electrode gap. The two electrodes are two rectifying contacts on the surface of the semiconductor irradiated by the laser beam. For a symmetric electrode configuration, the short circuit photo-current arising from the laser illumination will exhibit a null when the laser spot is symmetrically located relative to the electrodes, and will traverse in a well-defined manner as the laser spot is scanned to either side of the symmetric position, thus allowing a readout indicative of acceleration or vibration (in the case of an elastically deformable linkage between beam source and sensor) or indicative of temperature (in the case of a thermally expandable linkage between beam source and sensor). Extension to a four-electrode configuration provides vibration or acceleration measurement in two dimensions. Combining two such sensors disposed in orthogonal planes facilitates three-dimensional vibration sensing.

BRIEF DESCRIPTION OF THE DRAWINGS

FIG. 7 illustrates a 3-dimensional vibration or acceleration sensor of the invention.

FIG. 8 illustrates an accelerometer in accordance with further preferred embodiment of the invention.

FIG. 9 illustrates a large range vibration or acceleration sensor in accordance with still another preferred embodiment of the invention using an array of contacts.

FIG. 10 illustrates a temperature sensor in accordance with one preferred embodiment of the invention.

DETAILED DESCRIPTION OF THE INVENTION

Figure 1:
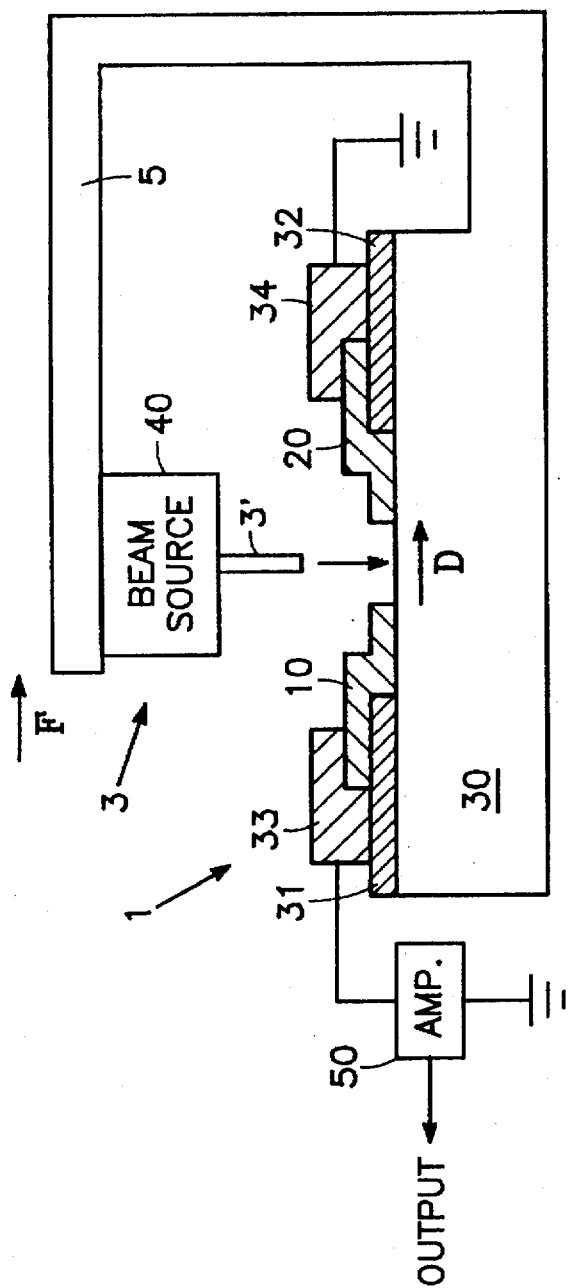
FIG. 1 is an elevational view of a vibration or acceleration sensor in accordance with a preferred embodiment of the invention.

Referring to FIG. 1, a semiconductor optical beam position sensor 1 is mechanically coupled to an optical beam source 3 with a constant or uniform intensity by a mechanical link 5 which is either an elastically deformable link (for vibration or acceleration sensing) or a thermally expandable link (for temperature sensing). The semiconductor optical beam position sensor 1 is a metal-semiconductor-metal Schottky-barrier photo-diode constructed by placing Ni contacts 10, 20 on lightly-doped Si (n-type, ~$10^{15}$ cm-3) substrate 30. The depletion region at each contact extends out laterally and transversely to a dimension determined by the dopant density of the Si substrate, the dielectric constant of Si, and the height of the Schottky barrier formed at the metal-semiconductor interface (approximately 0.6 eV for Ni:Si). In a preferred embodiment, a staircase structure is realized by employing a passive oxide layer 31, 32 over which portions of the nickel contacts 10, 20 are deposited, gold bonding pads 33, 34 being formed on the portion of the contacts 10, 20 overlying the passive oxide layers 31, 32.

Figure 2:
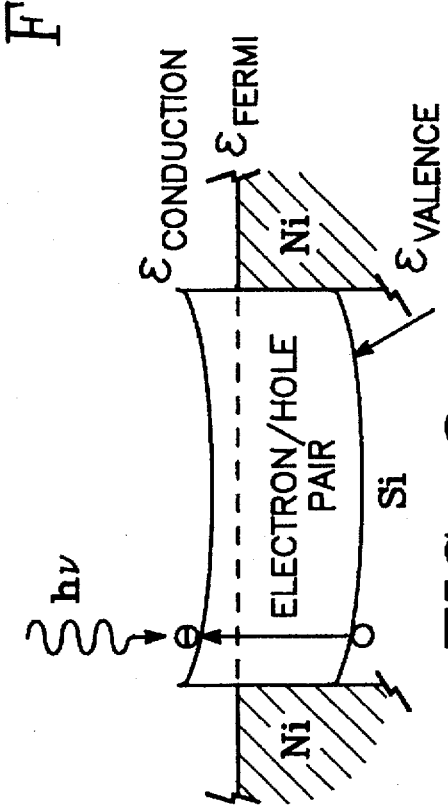
FIG. 2 is an energy band diagram corresponding to the semiconductor substrate depicted in FIG. 1 illustrating the effect of incident radiation.

The optical beam position sensor 1 is self-biasing. In other words, illumination within the inter-electrode gap (between the contacts 10, 20) by the optical source 3 (which may include a laser 40) creates electron-hole pairs in the Si lattice. The interplay between the electric field in the depletion region and the local fields results in a preferential motion of charges, in accordance with the 1-D energy band diagram of FIG. 2 corresponding to the semiconductor structure of FIG. 1. This motion is governed by the position of the illuminating beam within the contacts. As an example, when the center of the optical beam is aligned with the geometric center of the contact area, the charges generated optically diffuse in equal amounts towards the contacts yielding zero short-circuit current. The beam has a uniform optical density or intensity and traverses between the inter-electrode gap. As the beam traverses or is offset in either direction, a net current between the contacts 10, 20 is measured that varies directly with position. Consequently, since the optical beam position sensor 1 is self-biasing, it does not require an external applied bias or signal processors because the current detected is a direct measurement of the position of the illuminating beam within the inter-electrode gap. When the beam is shadowed by the Ni electrode, no current density is induced and the signal is zero. The beam spot size may be less than or equal to the inter-electrode gap. However, in a preferred embodiment, the beam spot size is smaller than the inter-electrode gap, and is on the order of a few microns.

Optics

The optical beam source 3 is of constant or uniform intensity and may be either a laser such as a HeNe laser with an optical fiber 3' coupled to it and facing the semiconductor substrate 30. (Alternatively, it may be a laser diode or a focused laser beam.) The end of the fiber 3' is cleaved and placed just above the semiconductor substrate 30. Preferably, the light source is a laser diode. A laser diode has a multimode wavelength in the range of 660–685 nm and a power output in the range of 1–5 mW. The photon energy (1.96 eV) is well above the Si bandgap threshold energy of 1.1 eV. It may be possible to miniaturize the sensor by integrating the source and the detector on a single substrate. The vibration sensor could also be integrated monolithically with other devices such as operational and instrumentational amplifiers, integrators etc.

Electronics

Figure 3:
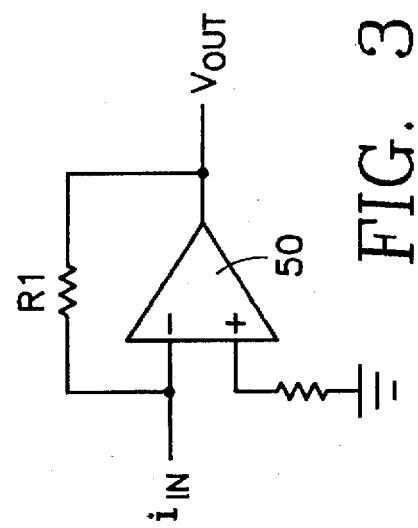
FIG. 3 is a schematic diagram of an operational amplifier circuit employed in carrying out the invention.

A simple current to voltage amplifier 50 is all that is needed to produce a significant output from these sensors. FIG. 3 is a schematic diagram of a simple op-amp circuit for the amplifier 50 of FIG. 1 that provides current to voltage conversion (Vout =i in×R1). The output from this circuit can be monitored with a digitizer or oscilloscope. An integrated circuit could be used to amplify and digitize the signal before it is transmitted from the sensors so that it can be directly read by a computer or other readout. Early experiments by the inventors herein have used a lock-in amplifier as a filtering system. The reference frequency is set to the vibration driver to detect the amplitude and phase of the detector output signal. The only phase shift observed was that due to the time constant of the filters used.

Preferred Embodiments of Detectors

Vibration Sensors

When an object undergoes mechanical vibration and stress, a continuum of mechanical frequencies will be stimulated in the object. A complete analysis of each vibrational mode would reveal information about amplitude and phase. However, this is beyond the scope of conventional detectors. The photonic-based detector of the present invention has a very fast response time and high resolving power, allowing complete vibrational analysis of frequency, amplitude, and phase.

Figure 4:
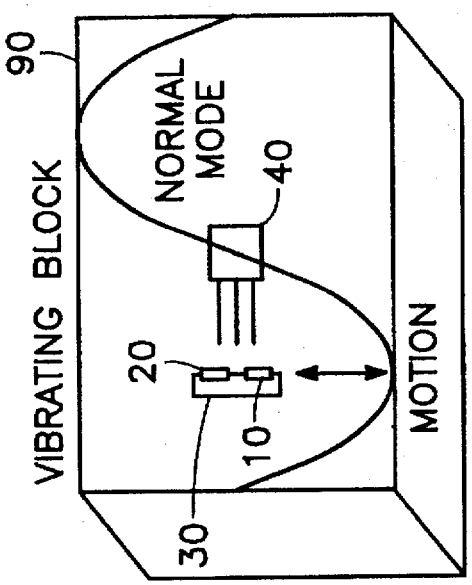
FIG. 4 illustrates an approximate simulation of photocurrent response as a function of displacement of the optical beam in the apparatus of FIG. 1.

In FIG. 1, a vibration sensor or accelerometer is realized if the mechanical link 5 is elastically deformable so that the laser beam 60 is displaced from one contact 10, 20 toward the other (i.e., from left to right in the drawing of FIG. 1). As the center of the laser beam 60 or spot is scanned from left to right, the detected current decreases away from the Ni electrode. The left-right displacement of the beam 60 is a direct reproducable foundation of the left-right acceleration force F acting on the sensor, and therefore the detected current is a direct indication of the acceleration force acting in the direction D of the separation between the contacts 10, 20. The resolution attainable is therefore limited by the noise in the system. FIG. 4 is a corresponding current versus position plot. Three types of vibration sensors of the invention include strain-gauge sensors, shear vibration sensors and accelerometers.

Shear Vibration Sensor

Figure 5:
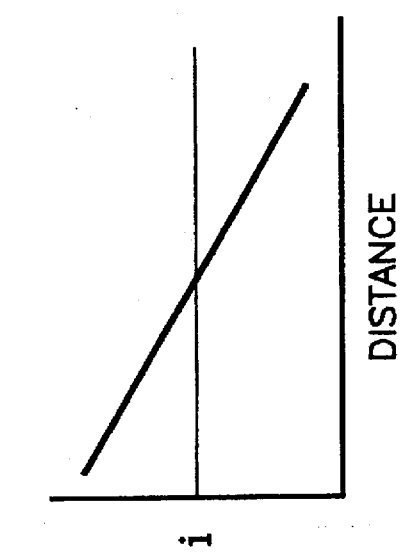
FIG. 5 illustrates a shear vibration or acceleration sensor in accordance with another preferred embodiment of the invention.

FIG. 5 illustrates another vibration sensor embodying the invention. The semiconductor substrate 30 of FIG. 1 is mounted on a stationary object 70, while the laser or optical source 40 is mounted on the vibrating object 80. The output current is proportional to the relative shear vibrations. Two-dimensional vibration detection is easily accomplished by adding a second set of Ni pads to the detector (not shown in FIG. 5) along a direction orthogonal (or at least non-parallel) to the direction along which the Ni pads 10, 20 lie. The current can now be monitored relative to both pairs of electrodes. Three dimensional sensing will require a second detector and light source mounted normal to the first set. The normal vibrations can be monitored in this manner with accuracy to 0.023 nm RMS. The detector could easily be made into a device for positioning on a larger scale by adding micrometers or other macro-positioning devices to the device substrates.

Free Standing Vibration Sensors

Figure 6:
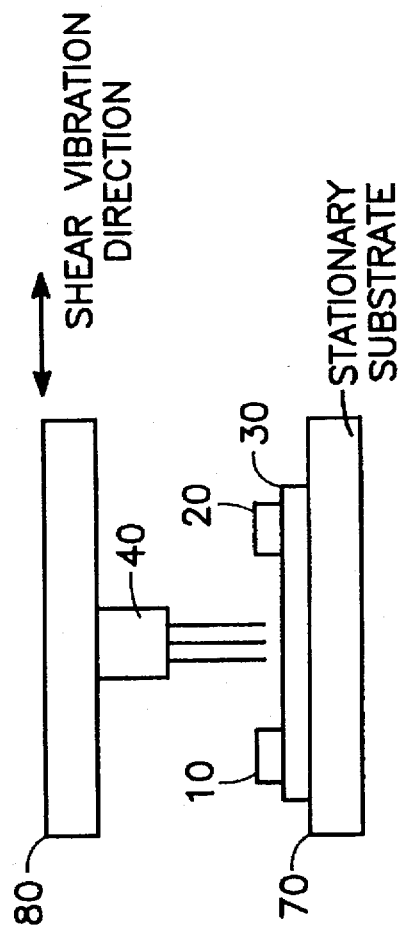
FIG. 6 illustrates a vibration or acceleration sensor in accordance with yet another preferred embodiment of the invention.

FIG. 6 shows a diagram of a single vibrational mode in a large block 90. The semiconductor substrate 30 with the contacts 10 and 20 is fastened to the block 90, as is the optical source 40, in the arrangment illustrated in FIG. 6. The block 90 will stretch and contract over time with an amplitude proportional to the wave pattern shown; for simplicity, we have chosen a single wave form with one node in the center of the block. Therefore, if the detector (including the contacts 10 and 20 on the semiconductor substrate 30 and the laser 40) is placed at the node in the center and the light source at the position of greatest amplitude change, small internal vibrations can be monitored. The actual motion would be described by many wave forms interacting with one another.

FIG. 7 shows a diagram of a two-dimensional vibration sensor of the invention, including the semiconductor substrate 30, a first pair of electrodes 10, 20 lying along one direction and a second pair of electrodes lying along an orthogonal direction 10', 20' and the laser 40. Three dimensional sensing provided by a third detector 10", 20", 30' and second laser source 40' (e.g., a second laser or else a common laser with a prism) normal to the two dimensional setup. The entire device can easily be integrated on a single substrate. The entire sensor can then be connected directly to the vibrating object. The mating arrangement is important since the vibrations must couple effectively into the sensor. The detection sensitivity will be severely hampered if mating between the sensor and the vibrating object is not rigid. Strong epoxy or cement is available for this purpose.

The ideal detector/source alignment would have the detector at a vibrational node and the source at a translation maxima; this distance is dependent on a number of factors: substrate composition and shape, and the amplitude and frequency of internal vibrations. A trade-off can be determined by using computer software packages to calculate the maximum bandwidth, sensitivity and detection range needed for the particular application. For example, a simple detector could be made that has maximum sensitivity at 60 Hz but is insensitive to 120 Hz vibrations. The 60 Hz apex is at the same position as a 120 Hz node. However, a detector with maximum sensitivity at 120 Hz would also serve as an excellent detector at 60 Hz. This sensor is designed to probe a fundamental frequency and its sub-harmonics.

A series of sensors with varying source-detector separations can be constructed for most possible applications. The lock-in technique can easily be employed with the above design. This technique will increase sensitivity and allow for spectral analysis, providing up to a 100-fold increase in signal to noise. The fast response time of the sensor of the present invention allows this technique to be employed.

Accelerometer

FIG. 8 is a diagram of an accelerometer embodying the present invention. The light source 40 is mounted on a rigid substrate 100 that is attached to the vibrating framework 110. The sensor 10, 20, 30 is inertial and is sensitive to vibrations at frequencies around the resonance frequency of the suspension 120 (springs, rubber, etc.) on which it is mounted to the vibrating framework 110. The vibrating framework includes an arm 110a which is configured to have maximum elastic compliance in response to accelerating forces acting along the direction of displacement D (FIG. 1) between the contacts 10, 20.

It may be possible to double the spatial response of a single sensor by detecting only half of the output wave form. Instead of starting with the spot in the middle of the detector, it would be focused right next to one of the Ni electrodes. An 80-micron inter-electrode gap size sensor could therefore detect a full 160 micron peak-to-peak spatial vibration, since only half of an AC signal is needed to determine frequency and amplitude.

Sensor arrays

FIG. 9 is a schematic of a multiple sensor array that would allow for much larger detection ranges with the same sensitivity. The light source 40 begins relatively close to electrode 20. The arrows indicate the direction of vibration. As a vibration is monitored, halfwave detection is used only considering the output between electrodes 10a and 20. When the vibration is large enough to translate the source to the edge of the electrode 10a, the detector region between the electrodes 20 and 10b will now be used. This array setup can be extended out to allow very large vibration detection with no loss in spatial sensitivity (e.g., amplitudes as high as 3 mm can be detected to within ±0.1 nm).

Temperature Sensors

Expanding substrate detector

FIG. 10 is a schematic diagram of the expanding substrate detector. The light source frame 140 is constructed from a separate material such as metal. A change in temperature will cause a distortion in the shape of both substrates 140, 30. If the coefficients of thermal expansion are sufficiently different, the spatial difference can then be monitored. An example is a steel/Si system. If both substrates 140, 30 are 10 mm in length, the steel of the frame 140 will expand 147 nm vs. 4.9 nm for the Si substrate 30 per degrees K. Since the spatial detection capability is 0.1 nm, one can determine a 0.001 degree K temperature change in the embodiment of FIG. 10. This resolution can be improved by using a more sensitive material or larger substrates. This design must be temperature-compensated to take into account the inherent change in current with temperature. This is accomplished by taking complete detector scans vs. temperature or by using a piezoceramic device to act as a calibrator on an adjacent identical sensor.

Mobility sensor

In accordance with another embodiment of a temperature sensor of the present invention, a simpler design uses the change in carrier mobility with temperature. The light source is held over the sensor at a fixed position. The current will change with temperature, based approximately upon Einstein's mobility equations. Specifically, as temperature decreases, there is less phonon scattering, increasing the mobility of charges that are photon-induced carriers and thereby increasing the measured current flow between the contacts 10, 20. Thus, current flow is inversely proportional to temperature in the sensor of this embodiment.

Figure 11A:
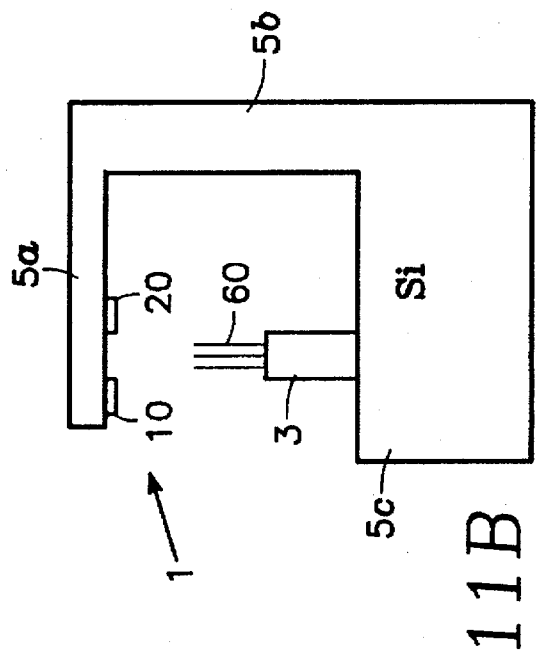
FIGS. 11A and 11B illustrate temperature sensors in accordance with other preferred embodiments of the invention.

However, in a preferred embodiment, the entire detector apparatus is constructed of the same material (e.g., silicon) in a configuration in which the mechanical arms supporting the optical source and the semiconductor sensor are of different shapes so as to either expand at different rates or in different directions. Specifically, referring to FIG. 11A, the semiconductor sensor 1 is supported on a first mechanical arm 5a extending from a center post 5b in one direction while the optical source 3 is supported on a second mechanical arm 5c extending from the center post 5b in the opposite direction, so that the two arms 5a, 5c expand in opposite directions with an increase in temperature (or contract in opposite directions with a decrease in temperature). As a result, any temperature change of the silicon structure 5a, 5b, 5c tends to scan the center of the beam 60 from left to right or else from right to left, depending upon whether the temperature change is an increase or decrease in temperature.

Figure 11B:
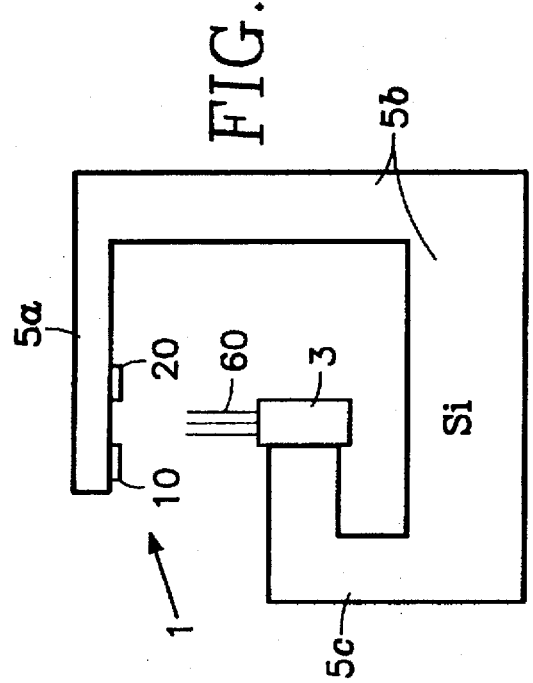

Referring to FIG. 11B, the arm 5a supporting the semiconductor sensor 1 is much thinner while the arm 5c supporting the optical beam source 3 is much thicker so that the two arms 5a, 5c expand relative to the center post 5b at different rates. As a result, any temperature change of the silicon structure 5a, 5b, 5c tends to scan the center of the beam 60 from left to right or else from right to left, depending upon whether the temperature change is an increase or decrease in temperature.

Figure 12:
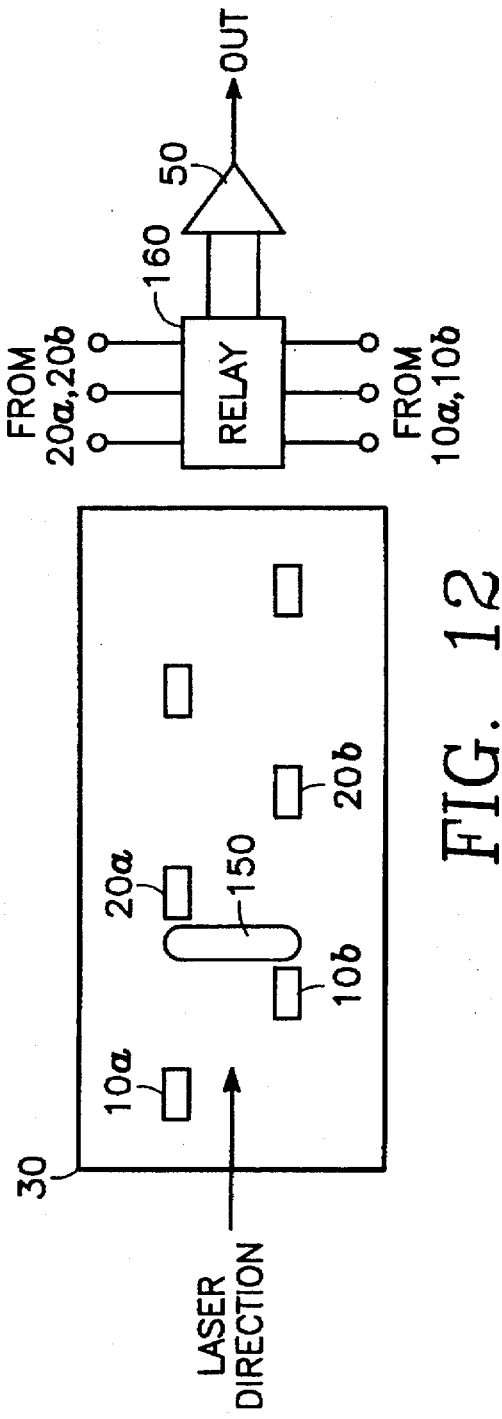
FIG. 12 illustrates a large range temperature sensor of the invention using two arrays of contacts.

FIG. 12 is a schematic of a multiple sensor array that would allow for much larger scanning ranges with increased sensitivity. As the expansion pushes the laser beam spot 150 on the surface of the semiconductor substrate 30 onto the electrode 20a, a computer-driven relay 160 switches the op-amp 50 to the lower set of electrodes 10b, 20b. Current is only produced when the light is over the Si in-between the Ni electrodes. As the beam spot 150 approaches the electrode 20b, the relay 160 switches the op amp 50 back to the top set of electrodes 10a, 20a.

This array design is more complicated that the single detector design, however a simple circuit can easily switch between sensing electrodes. The relative expanding substrates can be made larger in this design, producing a larger expansion difference and greater sensitivity.

Advantages of the Invention

The present invention has five major advantages over current vibration sensors:

1. Unprecedented position sensitivity: 0.023 nm rms.
2. Very short response time when biased: our sensors have a response time of <15ps which corresponds to 60 GHz (while the unbiases response about 3 GHz).
3. A simple structure that is easy to fabricate and can be integrated at low cost with current Si and GaAs VLSI (Very Large Scale Integrated Circuits) micro fabrication technology.
4. Highly accurate and reproduceable photonics based sensitivity vs. resistive sensing.
5. Excellent sensitivity and resolution over any thermal range.

An advantage of the embodiment including the optical fiber 3' cleaved near the semiconductor substrate 30 at the interelectrode gap between the contacts 10, 20 is that the optical fiber 3' may be made sufficiently long so that the light source at the opposite end of the fiber 3' is removed so far from the semiconductor substrate 30 that it is not affected by the environment (e.g., temperature or vibration) being sensed by the detector apparatus.

While the invention has been described in detail by specific reference to preferred embodiments, it is understood that variations and modifications may be made without departing from the true spirit and scope of the invention.

What is claimed is:

1. A detector, comprising:
   a self-biasing optical beam position sensor including a planar semiconductor surface with a pair of electrodes thereon defining an inter-electrode gap therebetween and means for detecting current flow between said two electrodes;
   a source of an optical beam incident on said surface and having a constant intensity which traverses within said gap; and
   a mechanical link coupling said optical beam position sensor and said source of an optical beam together.

2. The detector of claim 1 wherein said mechanical link is elastically deformable, whereby current flow measured by said means for detecting current flow is proportional to a force accelerating said detector.

3. The detector of claim 1 wherein said mechanical link is thermally expandable, whereby current flow measured by said means for detecting current flow is proportional to a temperature of said detector.

4. The detector of claim 2 wherein said mechanical link comprises a center post and a pair of generally parallel arms extending out form respective ends of said center post, said optical source and said beam position sensor being mounted on distal ends of respective ones of said arms.

5. The detector of claim 4 wherein said arms extend parallel to the displacement between said electrodes across said inter-electrode gap.

6. The detector of claim 2 wherein said mechanical link comprises an elastically deformable body on which said optical source and said beam position sensor are mounted, whereby acceleration of said detector displaces said beam in a direction parallel to the displacement between said contacts.

7. The detector of claim 3 wherein said mechanical link comprises a pair of coupled members of dissimilar materials having different coefficients of thermal expansion, said optical source and said beam position sensor being connected to respective ones of said pair of members.

8. The detector of claim 3 wherein said mechanical link comprises a center post and a pair of generally parallel arms extending out form respective ends of said center post, said optical source and said beam position sensor being mounted on distal ends of respective ones of said arms.

9. The detector of claim 8 wherein said arms extend parallel to the displacement between said electrodes across said inter-electrode gap.

10. The detector of claim 8 wherein said arms are configured differently from one another so that said optical source and said beam position sensor are displaced differently upon thermal expansion of said mechanical link.

11. The detector of claim 10 wherein said arms extend in opposing directions from said center post.

12. The detector of claim 11 wherein said center post comprises a pair of branches extending from a common apex thereof along different directions, said arms extending from distal ends of respective ones of said branches.

13. The detector of claim 12 wherein said arms extend parallel to the displacement between said electrodes across said inter-electrode gap.

14. The detector of claim 10 wherein said arms are of different volumes.

15. The detector of claim 10 wherein said arms are of the same material.

16. The detector of claim 15 wherein said material is the same as the material of said semiconductor substrate.

17. The sensor of claim 1 wherein said electrodes are disposed along a first direction, said sensor further comprising:

a second pair of electrodes on said semiconductor surface disposed along a direction non-parallel to said first direction, to provide two-dimensional position sensing; and second means for sensing current flow connected to said second pair of electrodes.

18. The sensor of claim 17 further comprising:

a second source of an other optical beam propagating along a direction non-parallel said optical beam mechanically coupled to said first source;

a second sensor comprising a second semiconductor surface, a third pair of electrodes on said second semiconductor surface facing said other optical beam;

third means for sensing photogenerated current flow connected to said third pair of electrodes.

19. The sensor of claim 6 wherein at least one of said arms is configured so as to have a maximum elastic compliance to a force acting along a direction of displacement between said electrodes.

20. The detector of claim 1 wherein said source of an optical beam comprises a light source and an optical fiber having two ends, one end of said optical fiber receiving light from said light source and the other end of said optical fiber being cleaved and adjacent said planar semiconductor surface at said interelectrode gap.

21. A detector, comprising:

a self-biasing optical beam position sensor including a planar semiconductor surface with a pair of electrodes thereon defining an inter-electrode gap therebetween and means for detecting current flow between said two electrodes;

a source of an optical beam incident on said surface and having a constant intensity which traverses within said gap; and said source of an optical beam comprising a light source and an optical fiber having two ends, one end of said optical fiber receiving light from said light source and the other end of said optical fiber being cleaved and adjacent said planar semiconductor surface at said interelectrode gap.

22. A method of measuring temperature with a self-biasing optical beam position sensor including a planar semiconductor surface with a pair of electrodes thereon defining an inter-electrode gap therebetween and means for detecting current flow between said two electrodes, said method comprising:

projecting the center of an optical beam onto a constant location on said surface within said inter-electrode gap with a constant intensity which traverses within said gap; and sensing changes in current flow between said electrodes with changes in temperature of said substrate.

* * * * *